US010701083B2

United States Patent
Jackson et al.

(10) Patent No.: US 10,701,083 B2
(45) Date of Patent: Jun. 30, 2020

(54) SYSTEMS AND METHODS FOR GENERATING AND VALIDATING CERTIFIED ELECTRONIC CREDENTIALS

(71) Applicant: PARADIGM, INC.

(72) Inventors: Christopher S. Jackson, Virginia Beach, VA (US); Peter A. Johnson, Virginia Beach, VA (US)

(73) Assignee: PARADIGM, INC., Virginia Beach, VA (US)

( * ) Notice: Subject to any disclaimer, the term of this patent is extended or adjusted under 35 U.S.C. 154(b) by 0 days.

(21) Appl. No.: 14/855,537

(22) Filed: Sep. 16, 2015

(65) Prior Publication Data

US 2016/0294845 A1    Oct. 6, 2016

Related U.S. Application Data

(63) Continuation of application No. PCT/US2015/049995, filed on Sep. 14, 2015.
(Continued)

(51) Int. Cl.
| | |
|---|---|
| H04L 29/06 | (2006.01) |
| G06Q 50/26 | (2012.01) |
| G06Q 30/00 | (2012.01) |

(52) U.S. Cl.
CPC ........... *H04L 63/123* (2013.01); *H04L 63/08* (2013.01); *H04L 63/0823* (2013.01); *G06Q 30/018* (2013.01); *G06Q 50/265* (2013.01)

(58) Field of Classification Search
CPC ....... H04L 63/12; H04L 63/123; H04L 63/08; G06Q 30/018; G06Q 50/265
See application file for complete search history.

(56) References Cited

U.S. PATENT DOCUMENTS 5,982,506 A    11/1999  Kara
6,018,801 A    1/2000   Palage et al.
(Continued)

OTHER PUBLICATIONS

International Search Report dated Dec. 11, 2015.
International Search Report and Written Opinion for PCT/US2015/049995, USPRO, dated Dec. 11, 2015.

*Primary Examiner* — Linglan E Edwards
(74) *Attorney, Agent, or Firm* — Joshua B. Brady; Nixon & Vanderhye, P.C.

(57) ABSTRACT

Systems and methods for generating and validating certified electronic credentials are disclosed. A certified electronic credential may comprise a computer-readable file representative of a credential bestowed upon a recipient, in which the file is protected with one or more document integrity and document usage security feature. A publisher may receive a certified electronic credential order from a credentialer and prepare a plurality of certified electronic credentials. The publisher may associate each credential with authentication information and a credential record, and retain a database of associated authentication information and credential records. The publisher may provide validation services, receiving a validation request through a credentialer's validation portal, and provide a response through the credentialer's portal indicative of the validity, additional information about the credential, and even an audit trail. A validating entity may receive credential validation through the credentialer with a heightened degree of confidence in the validation and lack of forgery.

30 Claims, 7 Drawing Sheets

Related U.S. Application Data

(60) Provisional application No. 62/140,898, filed on Mar. 31, 2015.

(56) References Cited

U.S. PATENT DOCUMENTS

| | | | |
|---|---|---|---|
| 6,111,953 A | 8/2000 | Walker et al. | |
| 6,158,003 A | 12/2000 | Kara | |
| 6,189,009 B1 | 2/2001 | Stratigos et al. | |
| 6,247,133 B1 | 6/2001 | Palage et al. | |
| 6,327,656 B2 | 12/2001 | Zabetian | |
| 6,658,394 B1 | 12/2003 | Khaishgi et al. | |
| 6,714,944 B1 | 3/2004 | Shapiro et al. | |
| 6,725,220 B2 | 4/2004 | Stratigos et al. | |
| 6,772,943 B2 | 8/2004 | Segal | |
| 6,917,724 B2 | 7/2005 | Seder et al. | |
| 7,016,666 B2 | 3/2006 | Lauper et al. | |
| 7,020,634 B2 | 3/2006 | Khaishgi et al. | |
| 7,080,041 B2 | 7/2006 | Nagel | |
| 7,117,363 B2 | 10/2006 | Lincoln et al. | |
| 7,134,020 B2 | 11/2006 | Eagle et al. | |
| 7,152,047 B1 | 12/2006 | Nagel | |
| 7,170,391 B2 | 1/2007 | Lane et al. | |
| 7,447,329 B2 | 11/2008 | Choi et al. | |
| 7,676,501 B2 | 3/2010 | Wilson | |
| 7,712,142 B1 | 5/2010 | Emigh | |
| 7,735,122 B1 | 6/2010 | Johnson et al. | |
| 7,770,013 B2 | 8/2010 | Rhoads et al. | |
| 7,877,365 B2 | 1/2011 | Wilson | |
| 7,996,367 B2 | 8/2011 | Foygel et al. | |
| 7,996,677 B2 | 8/2011 | Charles et al. | |
| 7,999,657 B2 | 8/2011 | Tian et al. | |
| 8,037,539 B2 | 10/2011 | Shapiro et al. | |
| 8,051,289 B2 | 11/2011 | Johnson et al. | |
| 8,086,867 B2 | 12/2011 | Freeman et al. | |
| 8,145,909 B1 | 3/2012 | Agrawal et al. | |
| 8,170,929 B1 | 5/2012 | Mallon et al. | |
| 8,326,838 B2 | 12/2012 | Gaitas | |
| 8,340,291 B2 | 12/2012 | Wanderley | |
| 8,477,992 B2 | 7/2013 | Paul et al. | |
| 8,479,007 B2 | 7/2013 | Tame | |
| 8,566,598 B2 | 10/2013 | Goodman | |
| 8,577,773 B2 | 11/2013 | Cappel et al. | |
| 8,605,296 B2 | 12/2013 | Fry et al. | |
| 8,620,676 B2 * | 12/2013 | Geller | G06Q 10/10 705/1.1 |
| 8,627,496 B2 | 1/2014 | Shapiro et al. | |
| 8,756,707 B2 | 6/2014 | Green | |
| 8,914,898 B2 | 12/2014 | Tharakan | |
| 2001/0047347 A1 | 11/2001 | Perell et al. | |
| 2003/0028494 A1 | 2/2003 | King et al. | |
| 2004/0078337 A1 | 4/2004 | King et al. | |
| 2004/0187076 A1 * | 9/2004 | Ki | H04L 29/06 715/208 |
| 2004/0250070 A1 | 12/2004 | Wong | |
| 2005/0177528 A1 | 8/2005 | Qamar | |
| 2006/0157559 A1 | 7/2006 | Levy et al. | |
| 2007/0220614 A1 * | 9/2007 | Ellis | G06F 21/6245 726/27 |
| 2008/0028220 A1 | 1/2008 | Wyssen | |
| 2008/0059803 A1 | 3/2008 | Tung | |
| 2008/0313186 A1 | 12/2008 | Marsh | |
| 2009/0132813 A1 | 5/2009 | Schibuk | |
| 2009/0158405 A1 | 6/2009 | Malkin | |
| 2009/0177694 A1 | 7/2009 | Olson | |
| 2010/0100465 A1 * | 4/2010 | Cooke | G06Q 30/04 705/34 |
| 2010/0217988 A1 * | 8/2010 | Johnson | G06F 21/6218 713/175 |
| 2011/0010757 A1 | 1/2011 | Tharakan | |
| 2012/0233705 A1 * | 9/2012 | Boysen | G06F 21/335 726/29 |
| 2013/0066795 A1 * | 3/2013 | Katz | G06Q 10/00 705/321 |
| 2013/0166463 A1 | 6/2013 | Samokhvalov | |
| 2014/0090036 A1 * | 3/2014 | Roberts | H04L 63/0884 726/6 |
| 2014/0157391 A1 | 6/2014 | Choi et al. | |
| 2014/0181927 A1 | 6/2014 | Sarkissian | |
| 2014/0279611 A1 | 9/2014 | Evans et al. | |
| 2014/0304183 A1 * | 10/2014 | Zabar | G06Q 50/265 705/321 |
| 2015/0026476 A1 | 1/2015 | Schwarz et al. | |
| 2015/0052615 A1 | 2/2015 | Gault et al. | |
| 2015/0074757 A1 | 3/2015 | Sharma | |
| 2015/0195095 A1 | 7/2015 | Gillead et al. | |
| 2015/0249661 A1 * | 9/2015 | Cauthen | G06Q 50/01 726/10 |
| 2015/0278824 A1 * | 10/2015 | Zabar | G06Q 30/018 705/317 |

* cited by examiner

SYSTEMS AND METHODS FOR GENERATING AND VALIDATING CERTIFIED ELECTRONIC CREDENTIALS

CROSS REFERENCE TO RELATED APPLICATIONS

This application is a continuation of International Application No. PCT/US15/049995, filed Sep. 14, 2015, which claims the benefit of U.S. Provisional Patent Application No. 62/140,898, filed Mar. 31, 2015, the contents of which are expressly incorporated by reference.

STATEMENT REGARDING GOVERNMENT SUPPORT

None.

FIELD

The present disclosure relates to systems and methods for generating and authenticating credentials, and in particular electronic credentials.

BACKGROUND

Awarding the paper credential within the United States and several other countries has historically served as a ceremonial event recognizing an accomplishment. The official proof of that credential/accomplishment has more often than not relied on other official documents, like a University/College transcript, an official government form, and so forth, such that the credential itself has been more for display/ceremonial purposes. However, the paper credential outside of the United States has very much served as the official proof of the accomplishment and is used for a variety of reasons, including employment and for obtaining foreign visas. Official documents within the United States, like a transcript, serve little to no purpose outside of its borders. Additionally, within the United States there has been a lack of recognition by the Credentialer that the paper credential has significant transactional value. The paper credential, for example a diploma, is accepted by many entities in the United States, including not only prospective employers, but also various government agencies and regulatory authorities. For example, State Governments accept a diploma as part of meeting requirements for a medical license. In other countries, including throughout Europe and the United Kingdom, the paper credential is widely regarded as the primary document for establishing an individual's educational background and academic credentials. The overall acceptance of the paper credential has created a market for fraudulent paper credentials, with an estimated $2 Billion worldwide market value.

There exists a need to bridge the gap between the United States and almost all other countries, in terms of what is accepted as the official proof of an individual's credential(s). There is also a need for a paradigm shift within the United States in recognizing the paper credential as having transactional value. Given the presence of the fraudulent credential market, there is also a need to present credentials in a highly secure format that is verifiable through a trusted source. Secure formats protect the Credentialer's credential(s) from fraud and misuse, strengthening the value and goodwill associated with the credential. Providing a verification mechanism enhances the trust that individuals place in the credential.

The production, delivery and authentication of Credentials have historically revolved around the issuance of paper documents, e.g., diplomas, certificates, and so on. The process has involved traditional forms of printing the design, such as offset, thermography, engraving, etc. and personalizing the Credential with the Recipient's credential information using various methods, such as a letterpress or laser printer. The distribution of the paper credential has typically involved either mailing that credential back to the Credentialer for distribution to the Recipient and/or mailing the paper Credential directly to the Recipient from the printing entity. The authentication of the printed Credential has often been as simple as a. Recipient presenting the Credential to a Receiving Entity. For more discerning Receiving Entities, either direct contact with the Credentialer, having a subscription with a third party Credential verification, service, notarization of the document, or in some cases an Apostille is required for validation of the Credential. These processes are often open to fraud, are expensive, and/or may take a significant amount of time.

In addition to paper credentials, an increasing number of Credentialers are offering various electronic indicia of credentials. These electronic indicia range from near-duplicates in Portable Document Format (.pdf) having various levels of file protection, to web-accessible and ad-hoc generated transcript reports. Acceptance of electronic indicia has been slow and varies depending on the party receiving the electronic indicia. The acceptance of electronic indicia of credentials has been relative slow for various reasons, including, for example, the ease of generating fraudulent electronic documents; the lack of Credentialer interest and resources in developing, maintaining, and supporting an electronic indicia family; the variations in electronic indicia format and the lack of consumer-recognized formats; difficulty in verifying the credential; and absence of wide-spread use.

To date, the inventors are not aware of any existing systems or methods that recognize the transactional value of the credential, generate the confidence needed for the credential's acceptance, and in particular any that overcome the challenges facing electronic indicia of credentials. For example, U.S. Patent Application Publication 2014/0101264 A1 to Dewaele et al., describes generating a secure electronic certificate from information collected and stored in a centralized server, but suffers from a number of flaws. For instance, Dewaele does not address the importance of the electronic certificate's design as it relates to the Credentialer's existing portfolio of credentials. As a result, Dewaele's system suffers from the same problems as contemporary electronic indicia, and consumer recognition and widespread acceptance is minimal. Additionally, Dewaele's system provides an authentication mechanism directly through the electronic indicia generator's servers. As a result, either each Credentialer must provide its own verification services, straining the Credentialier's resources, or an unknown and unrecognized third party is providing the validation data. Neither scenario is desirable.

With respect to security of the electronic indicia, Dewaele and other contemporary systems allow the electronic document to be printed, which increases the likelihood of fraud and misuse.

What is needed are secure systems and methods to efficiently generate and deliver large quantities of unique and secure electronic credentials.

What is also needed is the ability to authenticate an electronic credential that gives the authenticating party the needed level of confidence and assurance that the credential is authentic and valid.

BRIEF SUMMARY

This disclosure relates to systems and methods for generating and validating credentials, and in particular certified electronic credentials.

As used herein, a "Credential" is an item that provides the basis for confidence, belief, credit, evidence of authority, status, rights, entitlement to privileges, or the like, of an aspect of the Recipient's background. The Recipient is an individual, such as a student, professional, governmental officer, or the like, that has received the Credential from a Credentialer. The Credentialer is an entity, organization, body, or the like, that awards the Credential to the Recipient. For example, a Credentialer may award a Credential to a Recipient who has successfully completed one or more Courses. Recognition of a Credential may comprise, for example, a scholastic diploma, academic transcript, award, certificate or other issuance that represents an achievement. A Course may be, for example, a field of study that is widely accepted and/or accredited, such that the completion of the Course gives the Recipient knowledge that has transactional value within a market. A "Certified Electronic Credential" is a digitally or electronically produced credential, e.g. a computer-readable file representative of a credential, protected with one or more security features, and assigned one or more identifying features for use with validating the credential.

A Receiving Entity is an individual, organization, body, or the like, that requires proof of a Credential. Transactional value in the ease of Credentials allows a Recipient to present to a Receiving Entity a Credential and obtain something of value in return, such as permanent or temporary employment, for example. A Receiving Entity often seeks to verify, validate, or authenticate a Credential. In such cases, the Receiving Entity may also be a Validating Entity. Validating a Credential is generally, to provide the Receiving Entity with a reasonable level of confidence and certainty that the Credential is valid, e.g., that a Credentialer awarded the Credential to the Recipient, and may in some embodiments include authenticating the Credential.

Some embodiments may be practiced as an electronically implemented method for validation of a certified electronic credential. Generally, the method may include storing a plurality of certified electronic credential records and associated authentication information, each record associated with an authentication in formation, in a validation database; receiving a certified electronic credential validation request and proffered authentication information from a credentialer validation portal; identifying a certified electronic credential record in the validation database associated with the proffered authentication information; generating a validation response based on the identified certified electronic credential record; and transmitting the validation response to the credentialer validation portal. Some embodiments may include determining whether the proffered authentication information is associated with an invalid credential, and wherein the validation response comprises a neutral response when the credential is invalid. Some embodiments may include receiving a credential update from a first credentialer, wherein the credential update modifies a certified electronic credential record associated with a credential issued by the first credentialer. In some embodiments, the certified electronic credential validation method may permit a validating entity to submit the certified electronic credential validation request and proffered authentication information through the credentialer validation portal, thereby providing the validating entity an enhanced level of confidence that the validation results are valid and authentic. It should be understood that systems may be practiced to implement the methods described herein.

The validation response may include, for example, validating information associated with the identified certified electronic credential record, which may vary depending on the particular embodiment. For example, the validating information may include at least one of the Recipient's identity, a confirmation of the credential(s) bestowed upon the Recipient, a date associated with a credential, coursework, grade point average, class rank, and security clearance. In some embodiments, the validation response may include a validation transactional record. A validation transactional record may include various information depending on the embodiment, such as, for example, information relating to the validation response, the date of the validation response, the proffered authentication information, the credential associated with the proffered authentication information, and the identity of the credentialer. In some embodiments, the publisher and/or the credentialer may generate a record relating to the validation response and the transmittal of the validation response.

In some embodiments, the method may include steps such as generating certified electronic credentials. For example, embodiments may include receiving an order for a plurality of certified electronic credentials from an ordering credentialer; producing the plurality of certified electronic credentials; associating an authentication information with each certified electronic credential; and generating a certified electronic credential record for each certified electronic credential. Methods may also include delivering the plurality of certified electronic credentials and associated authentication information to at least one of a plurality of recipients and a credentialer. Certified electronic credentials may vary, and may include at least one document integrity security feature and at least one document usage security feature. Certified electronic credentials may include an associated authentication information, such as a universal record locating number. In some embodiments, the universal record locating number may be developed by a publisher using a secret algorithm.

DESCRIPTION

The following description is of the best currently contemplated mode of carrying out exemplary embodiments of the invention. The description is not to be taken in a limiting sense, and is made merely for the purpose of illustrating the general principles of the invention.

Disclosed herein are systems and methods for generating and validating Certified Electronic Credentials. A Certified Electronic Credential is a digitally or electronically produced credential, e.g. a computer-readable file representative of a credential, protected with one or more security features, and assigned one or more identifying features for use with validating the credential. The Certified Electronic Diploma™, or CeD™, is an example of a Certified Electronic Credential. Typically, the Certified Electronic Credential is distributed using various mechanisms in order to ensure that the Credential is ultimately delivered to the Recipient. As described herein, credential validating may be performed through the Credentialer, involve the Publisher in providing a service or services that aid the validation process.

A Credential is an item that provides the basis for confidence, belief, credit, evidence of authority, status, rights, entitlement to privileges, or the like, usually in written form. Recognition of a Credential may comprise, for example, of a scholastic diploma, academic transcript, award, certificate, or other document that represents an achievement.

Figure 1:
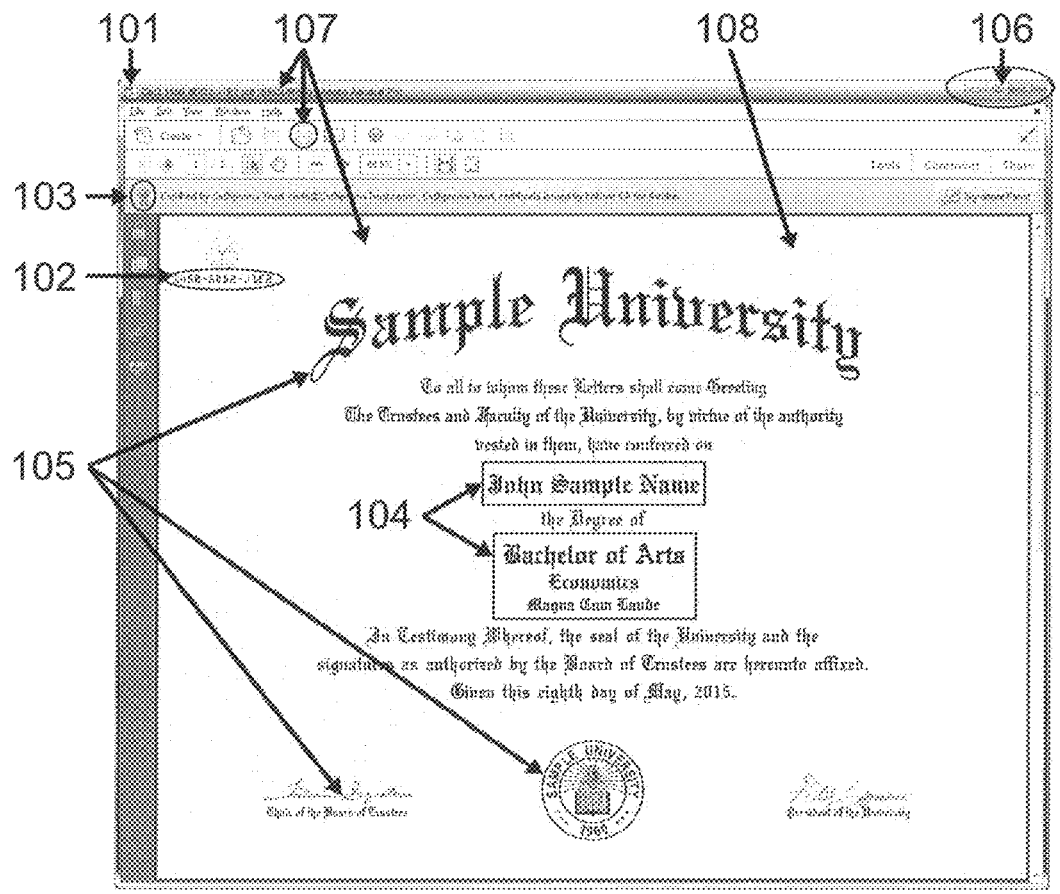
FIG. 1 shows an embodiment of a sample certified electronic diploma.

FIG. 1 shows an embodiment of a Certified Electronic Credential 101, which in this embodiment is an image of a Certified Electronic Diploma in .pdf format. The demonstrative Certified Electronic Credential 101 may include a Universal Record Locating Number (or "URLN") 102. URLN 102 may comprise, for example, a unique combination of letters, numbers, and/or symbols. In some embodiments, URLN 102 may comprise a unique machine-readable code, such as a unique bar code or QR code. The URLN may allow for unique identification of the Certified Electronic Credential 101 and a link to one or more original data elements comprising the credentials, such as may be supplied by the Credentialer. The Certified Electronic Credential 101 may include one or more document integrity security features present through, for example, Adobe Digital Signature, ribbon bar 103. Document integrity security features may include, for example, tamper detection features and may show the issuance by a Trusted Entity. A document integrity security feature may include, for instance, an Adobe Digital Signature, digital certificate, and similar security features. Some embodiments may employ sanitization, i.e., removing selected metadata, such as metadata relating to the electronic file, such as information about the file's creation and/or rasterization of one or more images. A document integrity security feature may show whether the Certified Electronic Credential 101 has been tampered with, such as, for example, alteration of the data that comprises the portable document file for the Credential 101. Document integrity security features may also perform document usage security features as described above, such as, for example, password protection of one or more features, and disruptive filaments or patterns 108, such as moirés.

The Certified Electronic Credential 101 may include any artwork 105 that associates the Certified Electronic Credential 101 with the Credentialer. The artwork 105 may depend on the type of credential, and may include, for instance, the name of the Credentialer, the seal and/or logo of the Credentialer, the signatures of one or more approving authorities, and other artwork that associates the Certified Electronic Credential 101 with the Credentialer. The Certified Electronic Credential 101 may show credential information 104, such as the Recipient or Organization receiving the credential, along with the awarded credentials, awarded date and other information specific to the Certified Electronic Credential 101.

The Certified Electronic Credential 101 may be displayed in a number of viewable electronic environments, such as a portable document file, that may have one or more buttons 106 to operate the viewable electronic environment, such as buttons to open, close, and minimize a window showing the electronic file. The Certified Electronic Credential 101 may have one or more document usage security features 107 to prevent misuse or unauthorized use of the Certified Electronic Credential 101. Document usage security feature 107 may include, for example, file password protection to prevent unauthorized access to the Credential 101, printing and copying restrictions or disablement, image disruptions such as filaments or patterns 108 in the background and/or foreground of the Credential 101, and other features known in the art, that limit or restrict the authorized use of the Certified Electronic Credential 101 as desired.

As described above, a Certified Electronic Credential is a computer-readable file representative of a credential, that typically has one or more features such that, when presented to a Receiving Entity, the Receiving Entity accepts the Certified Electronic Credential with confidence in its authenticity. Computer-readable files may be in various formats. One example is the Portable Document Format (PDF), identified by the file extension .pdf. Generally, a PDF is a file format used to present documents in a manner independent of application software, hardware and operating system. Such features may involve document integrity security features and/or document usage security features, for example, to prohibit various forms of tampering and editing, and may include forms of password protection and/or any mechanism that shows the user that the document has been altered, tampered or edited since its original creation. Adobe Digital Signature ribbon bar 103 is an example of document integrity security features. The demonstrative Certified Electronic Credential 101 may comprise certification indicia, such as ribbon bar 103 present in the upper portion of the electronic document. In addition to confirming the presence of one or more document integrity security features, ribbon bar 103 may include various indicia of certification, such as known certification symbols, identification of the Publisher or certifier, or other independently verifiable indicia of certification. In some embodiments, such as embodiments in which the Certified Electronic Credential 101 is a PDF, ribbon bar 103 may be the Adobe blue ribbon in a blue bar as is known in the art. The Adobe ribbon bar may be used to indicate to a Recipient of the PDF that the file originated from the indicated Publisher, and has not been modified (either accidentally or deliberately) since publication. Some embodiments of the Certified Electronic Credential 101 may include additional information relating to the Recipient, the credential(s), and/or the Credentialer. For example, some embodiments may include information such as the Recipient's experiences, the qualifications for the credential, the Credentialer's entrance qualifications, and the like. In some embodiments, the Certified Electronic Credential may include such additional information in one or more subsequent pages in the graphical representation (e.g., additional pages in a .PDF file). In some embodiments, the Certified Electronic Credential may include information in a machine-readable .XML file, that may or may not be visible in the graphical representation of the Certified Electronic Credential. Some embodiments may make such information available during the validation process, described below in more detail.

Document usage security features may prohibit modification or misuse of the Credential 101, such as through Digital Rights Management policies that allow the Credentialer and/or Publisher to revoke or rescind use of the Recipient's credential at any point after its generation. For example, if the Credentialer determines that a Recipient fraudulently obtained a credential, the Credentialer may use document usage security features to restrict further use of the Certified Electronic Credential 101, by, as an example, preventing the PDF from opening as a viewable document. In some embodiments, the Credentialer and/or the Publisher may prevent printing, editing, re-transmission, and other actions, using known methods, including standard, electronic, and/or software print controls, such as may be provided through available software platforms including, for instance, software offered by Adobe.

Another document usage security feature example, that may be implemented through, for example, Digital Rights Management policies, includes a Validation mechanism such as discussed herein. Validation may be performed through a variety of methods. For instance, a Validating Entity may wish to validate the credential represented by the Certified Electronic Credential 101. Validation may include confirming that a Credential 101 is authentic, e.g., that the Credentialer issued the credential to the Recipient consistent with credential information 104.

A Validation mechanism may advantageously use URLN 102 to validate the Credential 101. In some embodiments, the Credentialer may provide an interface for the Validation mechanism, through which a Validating Entity may input the URLN 102 and receive a validation response, as described in more detail below. The interface may be, for example, a web site, SMS message, e-mail, or other similar electronic communication methods. Additionally, Credential 101 may also include various visual security features to make evident any modification to the visual aspects of the credential. An example of such visual features may include filaments or patterns 108 as shown in FIG. 1.

Certified Electronic Credentials, such as the demonstrative Certified Electronic Diploma 101 shown in FIG. 1, may be prepared and distributed according to various embodiments of the present approach.

In some embodiments, large quantities of Certified Electronic Credentials may need to be produced. For example, in the case of scholastic diplomas, hundreds, if not thousands, of unique Certified Electronic Credentials may need to be prepared. In such embodiments for producing large batches of unique Certified Electronic Credentials, the unique Certified Electronic Credentials may share various common elements, such as, for example, the name and artwork 105 of the Credentialer (e.g., credentialing school or university), and contain several varying elements, such as the credential information 104 (e.g., Recipient's name, degree earned and honors), the URLN, and the like.

Figure 2:
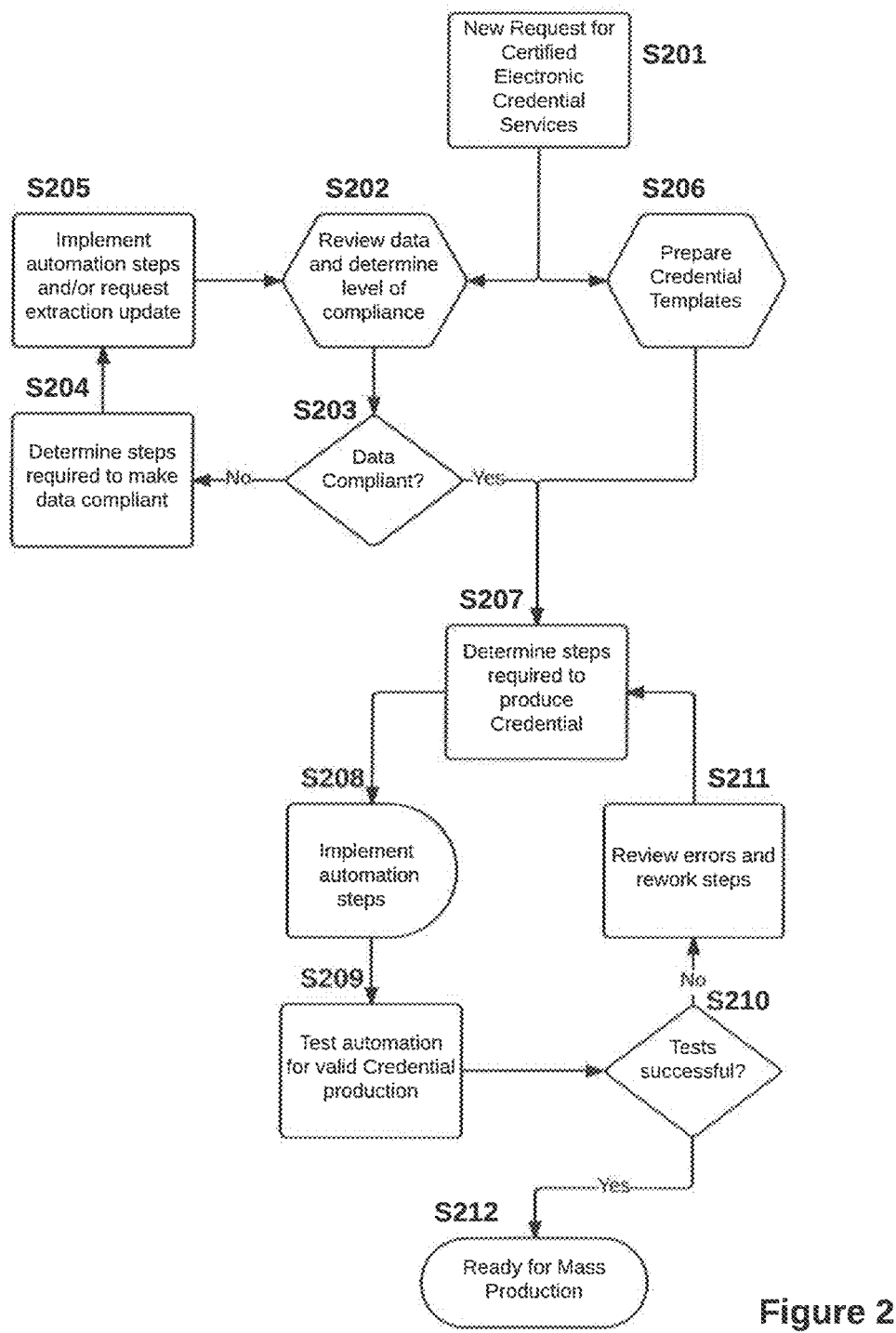
FIG. 2 is a flow chart of an embodiment of a data preparation process for mass producing Certified Electronic Credentials.

FIG. 2 is a flow chart of an embodiment of a data preparation process for mass producing Certified Electronic Credentials. In the depicted embodiment, S201 outlines a request from a Credentialer to the Publisher to have Certified Electronic Credentials produced. The request may include data from the Credentialer to prepare the Certified Electronic Credentials. Step S202 includes processes that may be required by the Publisher to determine whether or not the data received from the Credentialer is at an acceptable level of data compliance for production. Compliant data generally relates to producing a Certified Electronic Credential with limited manipulation of the Credentialer's data. At step, S203 the Publisher queries whether the data is compliant to the Publisher's applicable standards. At step S204, Publisher determines what steps, if any, are needed to make the data compliant. At step S205, Publisher implements any steps determined in S204, such that Certified Electronic Credentials can be produced from the Credentialer's data in an automated manner as described herein. In some embodiments, the Publisher may need to produce various templates and/or databases to be used for Certified Electronic Credential production as it relates to the Credentialer S206. This may include, for example, the placement of data elements and creation of artwork specific to the batch of Certified Electronic Credentials for the Credentialer's request.

Using compliant data, the Publisher may determine at step S207 the processing steps to produce the batch of Certified Electronic Credentials. These steps may include various forms of data transformation, manipulation, template selection, or other processes required to produce a Certified Electronic Credential. Once these steps, if any, have been determined, the Publisher may implement them into the production process at step S208. Some embodiments may include automation testing S209 on any of the aforementioned steps to ensure accurate Certified Electronic Credential production. At step S210, the Publisher queries whether any testing was successful. If the testing indicates a fault in the production, then the Publisher may at step S211 review the test results, identify any faults, and make adjustments to generate an accurate batch of Certified Electronic Credentials. Once testing is successful, the Publisher determines at step S212 that the batch is ready for mass production.

In some embodiments, the Publisher may transition from a data preparation process, such as the embodiment shown in FIG. 2, to mass production of Certified Electronic Credentials. In other embodiments, the Publisher may include elements of a data preparation process in the mass production process. For example, a Publisher may have completed prior batches for a Credentialer, and already have confirmation of complaint data and templates prepared. As another example, a Publisher may specify data formats for the Credentialer to meet, and proceed directly into mass production. It should be appreciated that the phrase mass production generally refers to the production of one or more batches of Certified Electronic Credentials.

Figure 3:
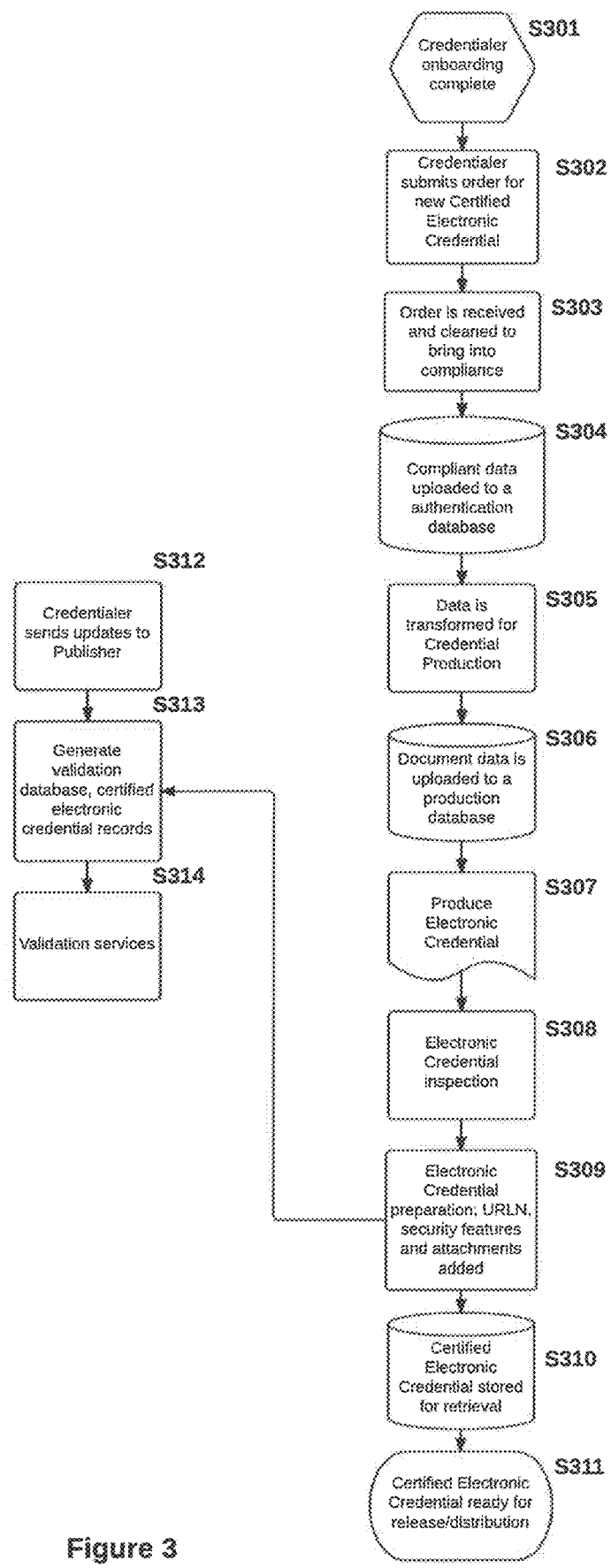
FIG. 3 shows a flow chart of an embodiment of a process for generating Certified Electronic Credentials.

FIG. 3 shows a flow chart of an embodiment of a process for generating Certified Electronic Credentials after any initial data preparation, testing, and any other setup is complete S301. In this embodiment, the Publisher receives an order for a batch of Certified Electronic Credentials and data S302 from a Credentialer. Of course, in some embodiments the Credentialer may have already provided data, if the Credentialer's data does not meet the Publisher's compliance standards, data cleaning procedures may be followed at step S303 to bring data into compliance before processing. The data may be stored for future use at step S304, such as, for example, to support a Validation mechanism as described herein. Examples of data storage may include system databases, file systems, or other storage mediums. In some embodiments, data transformations may be performed to present the data in a format that matches the Certified Electronic Credential and any associated art at step S305. Such transformations may include the rephrasing of terms, for example "Bachelor of Arts" may need to be presented as "The Degree of Bachelor of Arts," or "Information Technology" may need to be presented as "Certificate in Information Technology." The transformed data may be stored for future use at step S306. Examples of data storage may include system databases, file systems, or other storage mediums.

At step S307, the batch of Certified Electronic Credentials is produced. Generally, mass production may be performed by a process that combines the Credentialer's data with the associated art for the particular batch of Certified Electronic Credentials, generating an individual electronic file (e.g., PDF) for each credential included in the batch. In some embodiments, the production may be continuous between batches, e.g., a second batch enters production as a first batch is completed. The combining of data may be accomplished, for example, by document generation software such as Microsoft Word, Publisher, or Adobe Acrobat. In some embodiments, a Publisher may use proprietary document generation software. After step S307, the individual files in the batch are Electronic Credentials, as there have been no certifications applied. The resulting batch of Electronic Credential is inspected at step S308 to ensure that the documents match the Credentialer's specifications for the Credential. Various inspection methods may be used without departing from the principles described herein.

The Electronic Credential may also undergo a number of pre-distribution processes at step S309 that remove, add or alter the Electronic Credential in preparation for distribution. This may include, for example, the removal of any proprietary information created during generation, adding document integrity and document usage security features (e.g., to prevent tampering, editing or misuse of the document), which may also include some form of Digital Rights Management. For example, an Adobe Digital Signature may be applied to each Electronic Credential, with the Credentialer's desired certification information. Certification information may include the identity of the Credentialer, and/or the Publisher, among other information.

In some embodiments, a URLN is added to each Electronic Credential at step S309, while other embodiments may apply URLNs is earlier in the production, such as at step S307. For instance, a URLN may be assigned to each Recipient during earlier steps, such as data compliance, data cleaning, data transformation, or data upload steps. At this point, the Electronic Documents in the batch meet the Credentialer's specifications (and any additional specification, such as a Publisher's security and document control specifications) for a Certified Electronic Credential. The batch of Certified Electronic Credentials may be stored at step S310, and be made and ready for distribution at step S311. Examples of storage may include system databases, file systems, or other storage mediums, as are known in the art, and may include various data encryption algorithms. In some embodiments, The Publisher may store the Certified Electronic, Credentials, and/or may deliver Certified Electronic Credentials to the Credentialer or another party for storage and ultimate distribution to Recipients.

Additionally, the Publisher may generate a validation database and/or Certified Electronic Credential records at S313. The database may contain validation information, including, for instance, the URLN, credential information, and the like. The database and/or records may contain additional information if desired, such as the type of credential, the requisites for the credential, coursework, grade point average, comments and/or experiences specific to the Recipient and/or the credential, and the like. It should be apparent that a variety of information may be provided in response to a validation request, as discussed below. After the validation database is prepared, the Publisher may provide validation services S314, as described below.

In some embodiments, the Credentialer may provide the Publisher with updates to credential data at S312. For example, the Credentialer may add or remove Recipients, or determine that a Recipient did not fully satisfy requirements for a Credential. If an update is received after the preparation of Certified Electronic Credentials (e.g., at or after S309), then the Publisher may use the update to modify the validation database and/or credential records S313. The update may therefore be reflected when a Validating Entity attempts to validate a Certified Electronic Credential, as discussed more fully below. It should be appreciated that updates may be received at various stages of the process, and the process may therefore vary from what is shown in FIG. 3, without departing from the scope of this disclosure.

Figure 4:
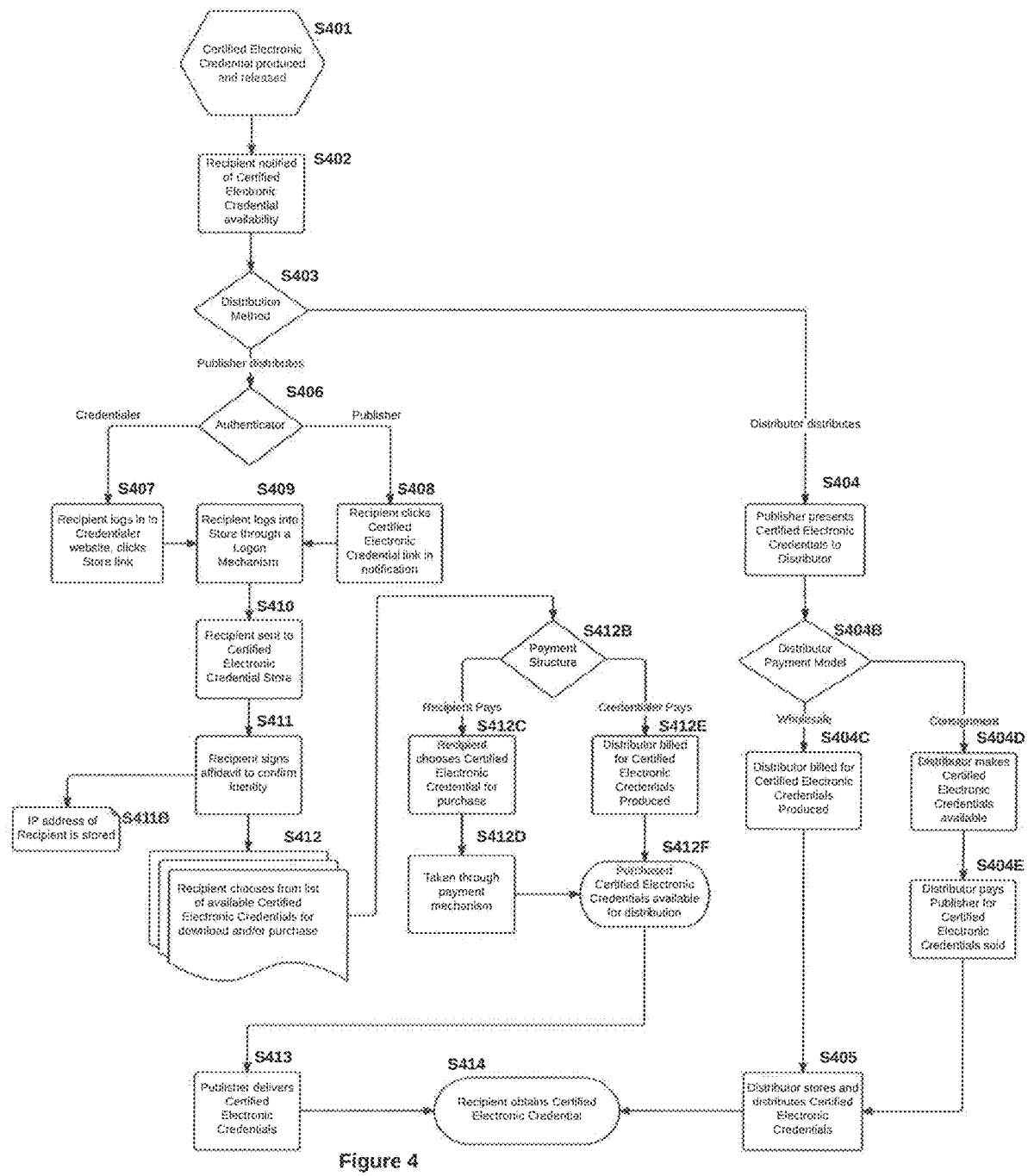
FIG. 4 is a flow chart of an embodiment of a process for distributing Certified Electronic Credentials.

In some embodiments, the Publisher may be involved in Certified Electronic Credential distribution after production. FIG. 4 outlines one embodiment of alternative methods for distributing Certified Electronic Credentials. In this embodiment, the alternative distribution methods include distribution by the Credentialer and distribution by the Publisher, but it should be understood that distribution may be made by a third party (that may or may not represent the Publisher and/or the Credentialer) without departing from this disclosure.

FIG. 4 is a flow chart of an embodiment of processes for the distribution and payment for Certified Electronic Credentials. After a Certified Electronic Credential has been produced and prepared for release S401, it is ready to be distributed to the Recipient, Credentialer, or a third party, typically depending on the Credentialer's preference. In some embodiments, the Recipient, Credentialer or third party may be notified of the availability of the Certified Electronic Credential S402. This notification may be via email, text, SMS Message, social media, mail, or any other form of electronic or physical communication. At step S403, the process determines the source of the distribution, e.g., distribution by the Publisher or a Distributor (e.g., Publisher or third party). Steps S404-S405 describe processes in which a Distributor may distribute the Certified Electronic Credentials. The Publisher may present and/or transfer the Certified Electronic Credentials to the Distributor S404. The method of transferal to the Distributor may be via cloud-based services, File Transfer Protocol (FTP), Direct Download, USB or other transfer medium known in the art. In some embodiments, the Publisher may receive payment prior to, upon, or following distribution.

Two embodiments of payment models are outlined in S404B-S404E, but it should be appreciated that other payment models may be used without departing from the scope of this disclosure. At step S404B, the process queries whether the Distributor is to pay along a wholesale or consignment model. In an embodiment in which the Distributor pays by wholesale, the Distributor may be billed for Certified Electronic Credentials received at step S404C. In an embodiment in which the Distributor pays by consignment, the Distributor makes the Certified Electronic Credentials available to the Recipient at step S404D. The Distributor then pays the Publisher upon sale of each Certified Electronic Credential to the Recipients at step S404E. Upon receipt of the Certified Electronic Credentials, the Distributor may store and/or distribute the Certified Electronic Credentials as appropriate S405.

In the alternative distribution method shown in FIG. 4, the Publisher distributes the Certified Electronic Credentials. It should be appreciated that a Publisher may use a variety of distribution methods without departing from this disclosure. Outlined in steps S406-S413 is an embodiment in which the Publisher utilizes an online store for distribution. The online store may be, for example, a secure website, mobile application, or some other interface that allows interaction between Recipients and the Publisher. The Publisher may require one or more forms of secure authentication to protect the Credentials from unauthorized access. For example, the authentication may originate from the Publisher or a third party, such as the Credentialer or another identity Provider. Step S406 determines whether the authentication, in this embodiment, originates from the Credentialer or the Publisher. In embodiments in which the Credentialer or Identity Provider authenticates, at step S407 the Recipient logs in to the domain of the Credentialer, or otherwise satisfies the Credentialer's or Identity Provider's authentication protocols, before accessing the Publisher's online store.

After satisfying the Credentialer's or Identity Provider's authentication protocols, the Recipient may be transferred to the online store via hyperlink or other known method of transfer. For example, in some embodiments the Credentialer's domain may include a hyperlink to the Publisher's online store for purchasing and/or downloading a Certified Electronic Credential. In some embodiments, the Recipient's transfer from the Credentialer's domain to the Publisher's online store may be readily discernable, e.g., the Credentialer's domain may indicate that the user is about to leave the Credentialer's domain, or the transfer opens a new window. In other embodiments, the transfer may be behind the scenes, such as data transmissions between the Recipient and the Publisher occur through the Credentialer's domain, such that the transaction appears to proceed without leaving the Credentialer's domain. In one embodiment, the Publisher's online store may have the same look and feel of the Credentialer's webpage, such that a user would not readily discern that the online store originates from the Publisher.

The Recipient's identity may be transmitted in a secure manner to the Publisher for means of authentication. In embodiments in which the Publisher authenticates, the Publisher may use one or more forms of authentication to confirm the Recipient's identity. For example, the Recipient may enter the Publisher's online store at step S408 via a link included in the notification received at step S402, with encrypted unique identity information. It should be appreciated that there are numerous known techniques for authenticating a user that may be applied to authenticate the identity of the individual attempting to access the online store to purchase and/or download a Certified Electronic Credential.

In the embodiment shown in FIG. 4, the Recipient may be authenticated in the online store using a Logon Mechanism at step S409. There are various methods and techniques for allowing an authenticated user to log into a secure website. For example, the Logon Mechanism may be a form of Single Sign-On ("SSO"), encrypted unique identity information in a hyperlink, a username and password, a Digital Certificate, or another means of user authentication. Upon successful logon, the Recipient may be authorized to enter the online store at step S410. In some embodiments, the Publisher may require that the Recipient sign an agreement confirming their identity S411. This agreement may be an affidavit, terms and conditions, or other form of agreement, the contents of which may vary depending on the type of credential (among other factors). For example, certain governmental credentials may require the Recipient to complete an affidavit attesting to identity and receipt. Some embodiments may include step S411B, in which the Publisher may log identifying information from the Recipient's logon at Step 409, including for example the IP address, name and/or location or other information pertaining to the logon and Recipient for record keeping and audit purposes.

Upon entry into the online store, the Publisher may at step S412 present to the Recipient a list of Credentials that may be available to the Recipient for download and/or purchase. For example, in some instances a Credentialer may award multiple credentials to the same Recipient, such as an academic diploma and related certificates. As another example, a Publisher may prepare Certified Electronic Credentials for the same Recipient from more than one Credentialer.

Some embodiments may require payment in exchange for providing a Certified Electronic Credential. In some embodiments, Credentials may require purchase before becoming available for download. It should be appreciated that there are various methods for receiving payment through an online store. Some embodiments may include more than one method or procedure. FIG. 4 shows one embodiment with alternative options for payment in steps S412B-S412F. Step S412B queries whether the payment will be made by the Recipient or the Credentialer. In an embodiment in which the Recipient pays for the Certified Electronic Credential, the Recipient selects one or more Credentials for purchase from a list of available Credentials at step S412C. The Recipient then proceeds through a payment mechanism to pay for the Credentials S412D. It should be appreciated that a number of payment mechanisms are known in the art that may be applied in embodiments. This mechanism may be, for example, through a purchasing website, such as PayPal, a separate merchant account, an online credit card processing system, or other form of payment processing. In an embodiment in which the Credentialer pays for the Certified Electronic Credentials, the Credentialer may be billed for the Recipient's Credentials at step S412E. Certified Electronic Credentials that have been purchased may be made available for download in the online store at step S412F. In some embodiments, the Recipient may select the number of purchased Certified Electronic Credentials for delivery at step S413. Some embodiments may restrict the number of Certified Electronic Credentials available for purchase and download. Delivery methods may include direct download, File Transfer Protocol (FTP), USE or other hard storage medium that can be sent via mail or any other method of data delivery. The embodiment shown in FIG. 4 concludes at step S414, after the Recipient has downloaded the Certified Electronic Credentials.

Making Certified Electronic Credentials available through the Publisher may be advantageous when the Publisher is better suited for storing and delivering Certified Electronic Credentials. For example, many Credentialers are not in the business of storing and distributing Electronic Credentials, and have neither the infrastructure nor the resources to do so. Additionally, the Publisher already has possession of the electronic files and data, organized and readily accessible, and may therefore maintain databases and support the online store more efficiently than the Credentialer. The advantage of the Publisher providing Certified Electronic Credential storage and delivery is compounded when the Publisher achieves economies of scale through providing those services for several Credentialers.

In order to preserve the confidence and authenticity of the Certified Electronic Credential, the Publisher may provide Certified Electronic Credential validation services for a Validating Entity, to validate a Certified Electronic Credential. For example, Receiving Entities such as prospective employers frequently conduct background investigations that include confirming a candidate's credentials. In this disclosure, a Validating Entity refers to a party seeking to validate a Certified Electronic Credential, and may include the Receiving Entity. Some Credentialers provide validation services, but at a considerable cost to the Credentialer and distraction from the Credentialer's primary business. There exist a small number of independent third party validation services. However, the failure with third party validation services is that the third party is not the Credentialer, and is thus an unknown and unrecognized entity to the Validating Entity. Regardless of the association between the Credentialer and third party, if the delivery of the validation/authentication is obtained from a party other than the Credentialer, the Validating Entity's confidence in the validation is significantly diminished. Indeed, unknown third party validation services introduce various avenues for fraud and misuse. To overcome the challenges associated with electronic indicia of Credentials, the Validating Entity must have confidence that the Credential is authentic. Confidence is best obtained when the Validating Entity communicates with the Credentialer in some manner.

Advantageously, the Publisher may utilize the Credentialer as the Validating Entity's gateway to receiving validation and provide the back-end validation service, similar to some of the purchase and delivery embodiments described above. Use of the Credentialer as the gateway for validation enhances the recognition and confidence to the Validating Entity that the Credential is authentic. Indeed, the many problems facing third-party authentication services may be avoided when the Validating Entity receives validation through the Credentialer. Additionally, the Publisher may be the best suited party for providing the back-end validation because the Publisher already has possession of the electronic files and data, organized and readily accessible, relating to the Certified Electronic Credentials. Moreover, the Publisher may have established infrastructure and capabilities to provide secure back-end validation services that would be costly and distracting for each Credentialer to provide.

It should be appreciated that the validation methods described herein are embodiments that are not intended to limit the scope of this disclosure. The validation method may utilize one or more form of identifier, such as an identification number or URLN. As described above, some embodiments include the Publisher establishing a URLN for each Certified Electronic Credential. The Publisher's method for establishing URLNs may be secret, making it more difficult to manufacture forged Electronic Credentials. For example, the URLN generation method may be based on one or more combinations of identifiers unique to the Recipient and for a particular credential. As one example, a URLN may be based on an identification number and the Recipient's first, middle, and/or last name. Other identifiers may include, for example, personal and/or academic information, student ID number, Social Security Number, birthdate, driver's license number, and other transcript information. In this manner, the Publisher may further increase the integrity of the Certified Electronic Credential.

Figure 5:
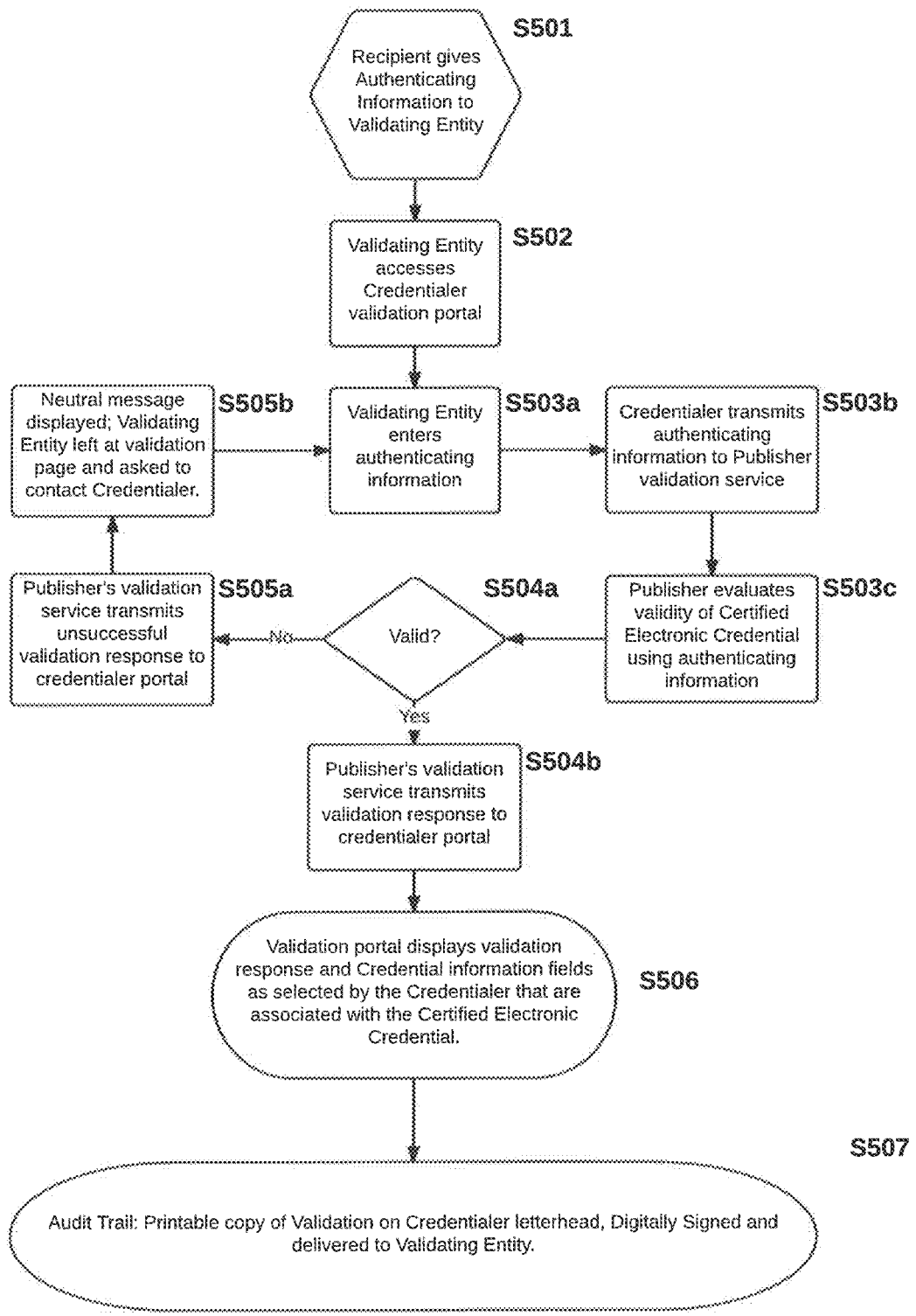
FIG. 5 is a flow chart of an embodiment of a process for validating a Certified Electronic Credential.

FIG. 5 is a flow chart of an embodiment of a process for validating a Certified Electronic Credential. The process begins at step S501, when a Recipient with a Certified Electronic Credential presents either a Certified Electronic Credential or the Authenticating Information to a Validating Entity. For example, an employment candidate may send a Certified Electronic Credential to a potential employer during an application process, provided that the document usage security features permit transmittal and duplication of the Certified Electronic Credential. As another example, the employment candidate may provide the prospective employer with Authenticating Information. Authenticating information may include, for example, one or more of the following: a URLN, the Credentialer and credential information, Student ID, name, personal ID, or other unique identification. The Validating Entity then proceeds to the Credentialer's validation portal at step S502. A validation portal may be, for example, a website, mobile application, desktop application, or other means of electronic communication. In embodiments in which the Credentialer is an academic college or university, the validation portal may include a web page on the registrar's website. In some embodiments, directions or a link to the validation portal may be made available on the Certified Electronic Credential. In some embodiments, a Validating Entity may proceed to a validation portal through a hyperlink embedded in the Certified Electronic Credential. At step S503a, the Validating Entity enters the Authenticating Information into the validation portal to submit a validation request. Entering the Authenticating Information may be through a number of known methods for entering data. For example, the information may be typed, scanned via barcode or other recognized computer language, entered automatically via hyperlink, or entered using other methods of data entry. Advantageously, the Validating Entity's validation request is made through the Credentialer itself, thereby providing the Validating Entity with an enhanced level of confidence, and minimizing the opportunities for fraudulent credentials and/or fraudulent validation services.

Although the Validating Entity makes the validation request through the Credentialer validation portal, the Credentialer provides a gateway for the validation service. At step S503b, the validation request and Authenticating Information may be routed from the Credentialer's validation portal to the Publisher's validation service. The Publisher may then evaluate the validity of the Certified Electronic Credential at step S503c. For example, the Publisher may access a database of validating information and/or Certified Electronic Credential records, to identify the appropriate Certified. Electronic Credential based on the Authenticating Information provided by the Validating Entity (e.g., URLN). As discussed above, the Publisher may advantageously provide Certified Electronic Credential storage and delivery services because of the Publisher's unique position, infrastructure, and given that the Publisher already has electronic files and data for Certified Electronic Credentials. Further, in some embodiments, the Publisher may generate and associate a URLN to each Certified Electronic Credential, using secret algorithms to generate URLNs to add an additional layer of security and integrity to the process. As a result, the Publisher may advantageously provide validation services to one or many Credentialers, using the URLNs, electronic files and data, for Certified Electronic Credentials produced by the Publisher. In some embodiments, the Publisher's validation services may be on the back-end, such that the Validating Entity is not aware of the Publisher's role in the validation process. For example, the Credentialer's validation portal may transmit a validation request and Authentication Information to the Publisher's validation service, and upon receipt of the validation request and Authentication Information, the Publisher's validation service returns a validation response to the Credentialer's validation portal. The Validating Entity may receive the validation response from the Credentialer's validation portal, along with the enhanced confidence in the validation from the Credentialer (as opposed to an unknown third party).

In some embodiments, the Publisher's validation service includes one or more validation databases. A validation database may include validating information relating to a Certified Electronic Credential, and may comprise a Certified Electronic Credential record with validating information for each Certified Electronic Credential. Validating information may include, for example, the Recipient's identity, a confirmation of the credential(s) bestowed upon the Recipient, date(s) associated with the credentials(s), and other information the Credentialer desires to make available to a Validating Entity. In some embodiments, validating information may include information about the credentials, such as coursework, grade point average, class rank, security clearance, comments and/or experiences specific to the Recipient and/or the credential, and the like. In some embodiments, the Credentialer may provide the Publisher with credential updates. A credential update may include information correcting or modifying Certified Electronic Credential record and/or validation information, such as changes to class rank or grade point average. A credential update may also include voiding or removing the credential, such as when the Credentialer revokes a Recipient's credential. For example, an academic institution may determine that a Recipient fraudulently earned a credential, and issue a validation update revoking the Credentialer's Certified Electronic Credential. Upon receiving a validation update the Publisher may update a Certified Electronic Credential record based on the validation update.

The Certified Electronic Credential record may be associated with Authentication Information, and alternatively may include an association between validating information and Authentication Information. For example, the Publisher's validation database may associate each Certified Electronic Credential record with Authentication information, such as a URLN, such that receipt of the URLN from the Credentialer's validation portal allows the Publisher's validation service to identify the Certified Electronic Credential record associated with the URLN. The Authenticating Information may be used to retrieve the validating information stored in a validation database, and generate a validation response. The validation response may include all or a portion of a Certified Electronic Credential record, such as validating information. At step S504a, the process queries whether the validation is successful e.g., a Certified Electronic Credential record is associated with the Authentication Information. It should be appreciated that the validation response may include various information relating to the validating information, and may be formatted in a number of manners. As discussed above, the Credentialer may provide a validation update to modify the Certified Electronic Credential record. The validating information may thus contain additional information that allows the Publisher and/or Credentialer to indicate a Certified Electronic Credential as being revoked or invalid. If a Credential has been marked as invalid, for example, a validation response may be returned to the Validating Entity as "unsuccessful." In some embodiments, the validation response may include additional information such as the date of credential revocation, the reason(s) for revocation, and so on. A validation request may also be unsuccessful because of an error in the Authentication Information.

As depicted in the embodiment shown in FIG. 5, if the validation is unsuccessful, the Publisher may at step S505a return an unsuccessful message to the Credentialer's web portal. The unsuccessful validation response may also include reason(s) for the unsuccessful validation. In some embodiments, the Publisher's validation service may provide the Credentialer with information relating to the unsuccessful validation request, such as to make the Credentialer aware of the reason(s) for the unsuccessful validation. At step S505b, a neutral message is displayed through the Credentialer's validation portal, for the Validating Entity to observe. In some embodiments, the neutral message displayed to the Validating Entity may include reason(s) for the unsuccessful validation, and/or recommend contacting the Credentialer. Of course, some embodiments may provide the Validating Entity with responses other than the neutral message, as may be desired in the particular embodiment.

If the validation is successful, then the Publisher's validation service may at step S504b transmit a validation response to the Credentialer's validation portal. The validation response may include, for example, confirmation that the credential represented by the Certified Electronic Credential is valid, and may include additional information as described herein. The validation response may be displayed through the Credentialer's validation portal at step S506, such that the Validating Entity may observe the successful validation response along with any additional information relating to the credential that the Credentialer desired Validating Entities to receive. In some embodiments, the validation response and any additional information may be printed or otherwise retained by the Validating Entity, to generate a validation transactional record or "Audit Trail" at step S507. In some embodiments, the validation response may include an electronic file, such as a PDF, of the validation transactional record. The validation transactional record may be a certified electronic document, in which a formal document (such as, for example, a validation confirmation prepared using Credentialer letterhead) is delivered to the Validating Entity as a PDF document with one or more document integrity security features and/or one or more document usage security features as described above. The validating transactional record may include various information to provide a complete audit trail as the case may require. In some embodiments, the Credentialer may determine the information included in a validation transactional record, in some embodiments, the Validating Entity may be given a menu of options for the validation transactional record and the information included therein. The Validating Entity may retain the validation transactional record for record keeping purposes and, if necessary, an audit trail. Additional auditing mechanisms may be provided in some embodiments. Auditing mechanisms may include, for example, digitally signed reports and/or files delivered to the Validating Entity containing the validation response and any additional information, an e-mail including the transaction information, or other forms of transactional record keeping. In some embodiments, the Publisher may retain a validation log. The validation log may include information relating to a validation request, such as, for example, the IP address of the Validating Entity, the identity of the Validating Entity (if known), the result of the validation request, and a record of any information provided in the validation response. In some embodiments, the Publisher may provide a validation log to a Credentialer or third party, which the Credentialer (or third party) may use for purposes such as identifying potential forgeries, and data analytics on credentials and the like.

Embodiments of the present approach may be employed through a system of servers, secure connections, security systems such as firewalls, computer systems, and databases, to connect the credentialing system to external and internal sources that are required to maintain, deliver, and validate Certified Electronic Credentials.

Figure 6:
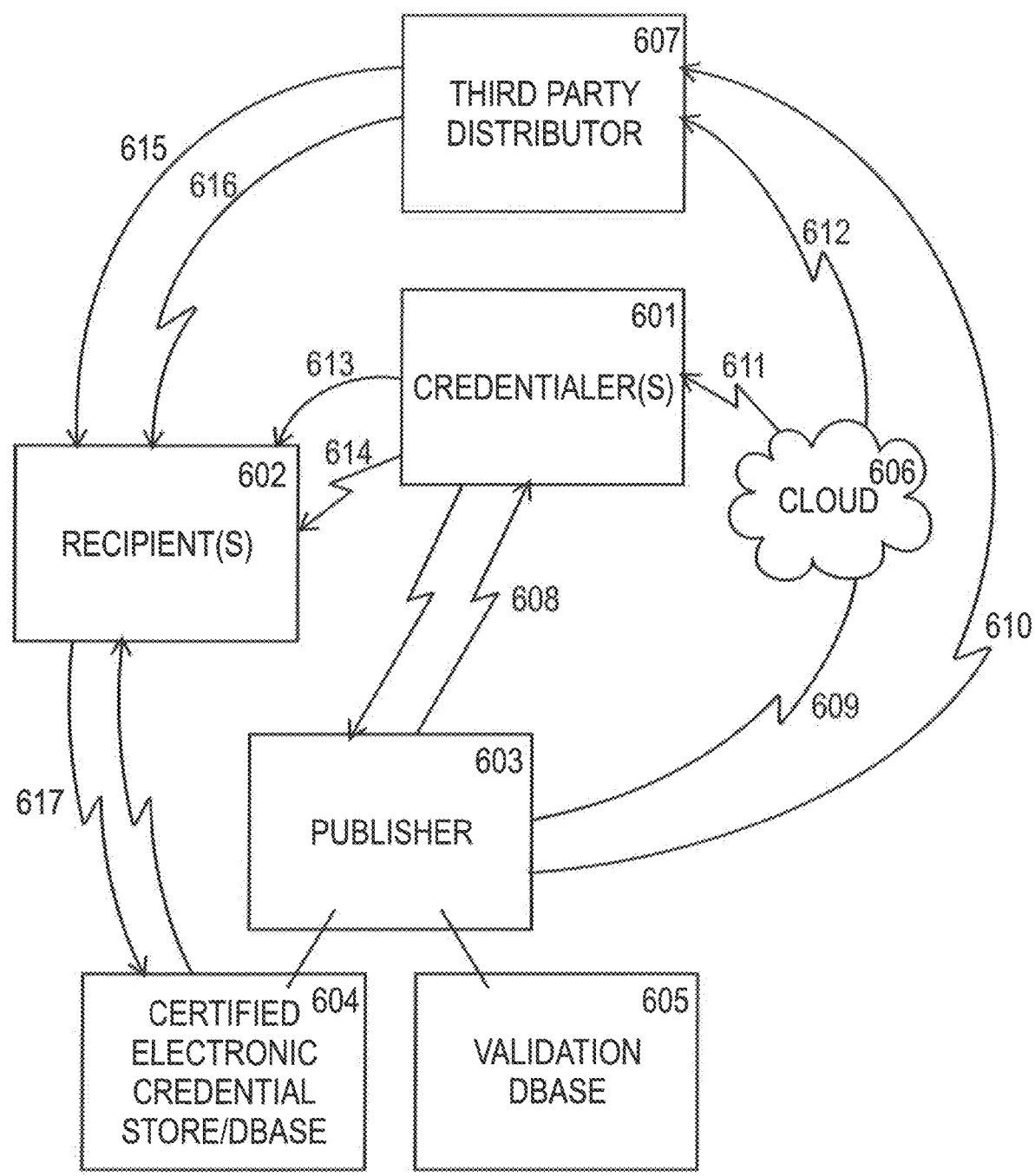
FIG. 6 is a drawing of an embodiment of a system for generating and delivering Certified Electronic Credentials.

FIG. 6 is a drawing of one embodiment of a system for generating and delivering Certified Electronic Credentials, and it should be appreciated that other embodiments are feasible without departing from the scope of this disclosure. In this embodiment, the Credentialer 601 may share Credential information with the Publisher 603, such as a request for Certified Electronic Credentials, through electronic communications 608. Electronic communications may be, for example, a file uploaded via a website or uploaded securely to the Publisher, a direct database transfer, a physical storage device, or other means of secure data transportation as are known in the art. The Publisher may process, clean, and/or transform the data before generating Certified Electronic Credentials and storing them in one or more Certified Electronic Credential databases 604, as described herein. The Publisher may also store Authenticating Information in one or more validation databases 605, for validation services as described herein. Databases may be protected behind a secure firewall, stored offline or offsite, and/or using a form of encryption, as are known in the art. The Authenticating Information may include various combinations of document identifiers, such as a URLN, personal information as it relates to the Recipient, and credential information, as set forth above. Certified Electronic Credential and/or Authenticating Information may be delivered to the Credentialer or a Third-Party Distributor 607 via electronic communication 608, 610, as described above. The Credential and/or Authenticating Information may also be uploaded to an online storage, for example cloud storage 606, via electronic communication 609. The Credentialer or Third-Party Distributor may download the Credentials via electronic communication 611, 612 from the online storage 606. The Credentialer or Third-Party Distributor may deliver the Credentials to the Recipient 602 via electronic communication 616, 614. The Credentialer or Third-Party Distributor may also deliver the Credentials to the Recipient using, for example, a physical medium delivered through via traditional physical delivery channels 613, 615. The physical medium may be, for instance, a USB, CD-ROM, DVD, or another form of physical storage as is known in the art. The Recipient may also request/retrieve the Certified Electronic Credentials directly from the Publisher through electronic commerce 617. Electronic Commerce may be an online store, mobile application, or an API, such as described above. The Publisher may send the Credentials to the Recipient via electronic communication 617. It should be apparent to one of ordinary skill that systems for implementing the present approach may vary depending on the particular embodiment, and that this disclosure is not intended to be limited to the embodiments described herein.

As can be seen in the embodiments described above, validation of a Certified Electronic Credential using the Credentialer as an integral part of the validation process, and in particular as the Validating Entity's gateway for validation, provides an advantageously high level of confidence that the Credential is valid and authentic. Indeed, third party validation services fail to achieve anywhere near a similar level of Validating Entity confidence.

Figure 7:
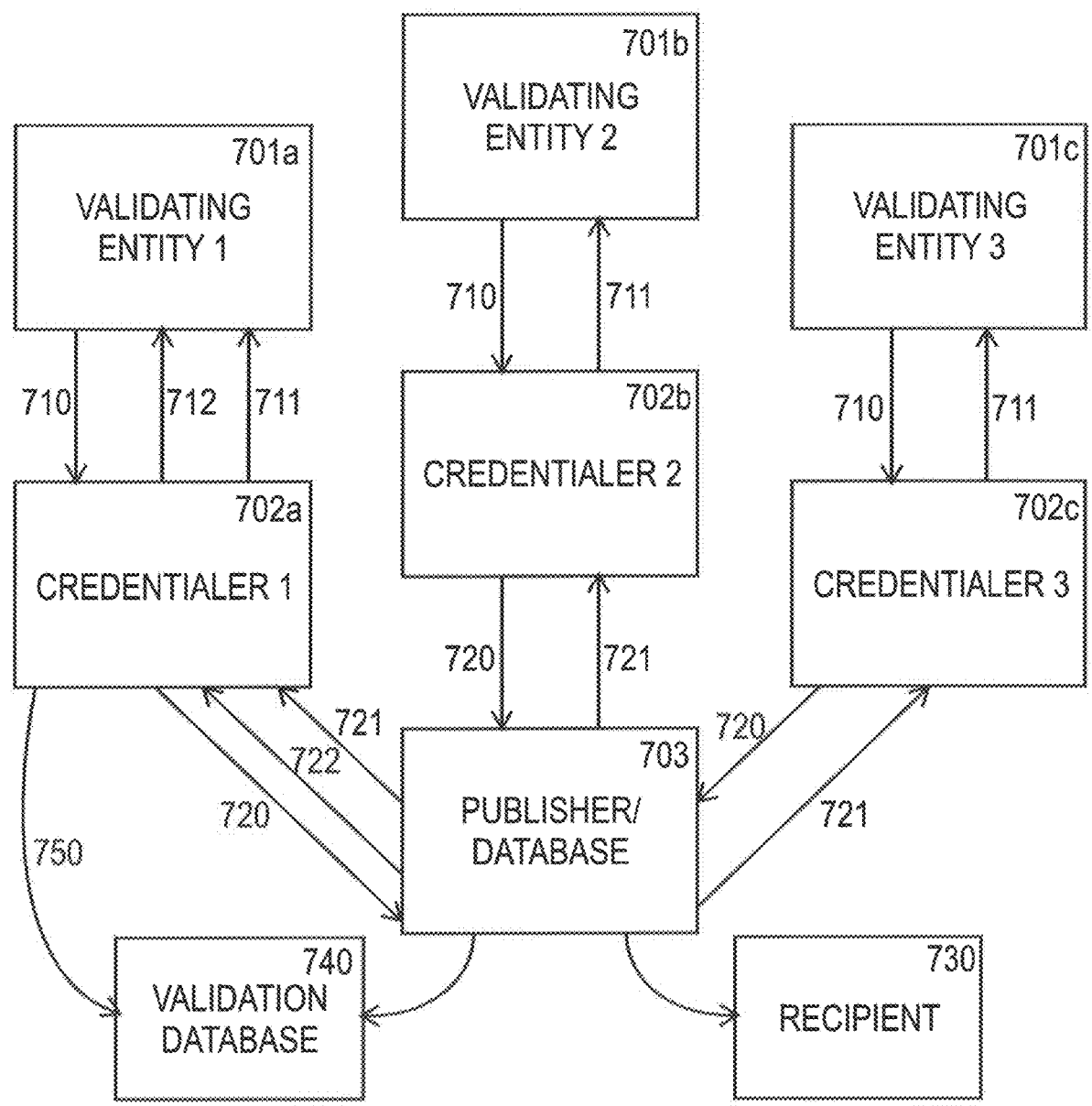
FIG. 7 illustrates an embodiment of a system for validating a Certified Electronic Credential.

FIG. 7 illustrates an embodiment of a system for authenticating a Certified Electronic Credential, in which Publisher 703 provides services to a plurality of Credentialers 702a-c. Validation begins with a Validating Entity 701(a, b, c). A Validating Entity may be, for example, an employer, prospective employer, government agency, credentialing agency, or another entity seeking to authenticate the validity of the Credentials. The Validating Entity may present Authenticating Information, such as a URLN, to the Credentialer 702(a, b, c) via electronic communication 710, such as an API, online interface and/or a mobile application hosted by the Credentialer. The Credentialer may contact the Publisher 703 with the Authenticating Information via online services 720, such as described above. The Publisher may receive the validation request and Authenticating Information through a validation request receiving unit and identify an associated Certified Electronic Credential record within a validation database 740, and generate a validation result. The validation result may include all or a portion of the Certified Electronic Credential record, credential information as it relates to the Recipient, and other desired information, as described above. The Publisher may transmit the validation result and any additional data to the Credentialer through electronic communication 721, to provide the Validating Entity validation result via electronic communication 711. For example, the validation result may be displayed in a desired form through a Credentialer's validation portal. As another example, a Credentialer may receive through electronic communication 721 a validation result and display the result in a desired form, and any additional information, to the Validating Entity. Additional services may be provided, such as notification to a Recipient 730, e.g., in the form of an e-mail or text message or other communications medium. A notification may provide various information to Recipient 730, such as whether a validation was performed on Recipient's Certified Electronic Credential. Some embodiments may provide a date- or time-stamped validation result, which as discussed above may include, for instance, credential information and other information, in a report transmitted to the Validating Entity via electronic communication 722, 712. The report may include recognized artwork, such as the Credentialer's letterhead, and may contain similar security features as the Certified Electronic Credential. As a result, the Validating Entity may retain records of the validation response, for archival and/or audit purposes. In some embodiments, the Publisher and/or the Credentialer may retain a record relating to the validation request and the validation response. In some embodiments, a Credentialer 702a or a third party may be given access to all or a portion of validation database 740. The validation database 740 may contain useful information and data to assist the Credentialer 702a or third party in assessing trends in Validating Entities, types of credentials being validated, geographical and/or temporal factors and the like. In some embodiments, validation database 740 may provide useful data for a wide range of business analytics. It should be apparent to one of ordinary skill that the types of information and data in a validation database 740 may vary from one embodiment to another, and as a consequence the types of analytics that validation database 740 may support can depend on the particular embodiment.

As will be appreciated by one of skill in the art, aspects or portions of the present approach may be embodied as a method, system, and at least in part, on a computer readable medium. Accordingly, the present approach may take the form of combination of hardware and software embodiments (including firmware, resident software, micro-code, etc.) or an embodiment combining software and hardware aspects that may all generally be referred to herein as a "circuit," "module" or "system." Furthermore, the present approach may take the form of a computer program product on a computer readable medium having computer-usable program code embodied in the medium. The present approach might also take the form of a combination of such a computer program product with one or more devices, such as a modular sensor brick, systems relating to communications, control, an integrate remote control component, etc.

Any suitable non-transient computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any non-transient medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present approach is described below with reference to flowchart illustrations and/or block diagrams of methods, apparatus (systems) and computer program products according to embodiments of the approach. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device or the like. Prompts may also be audible, vibrating, etc. Any flowcharts and block diagrams in the Figures illustrate the architecture, functionality, and operation of possible implementations of systems, methods and computer program products according to various embodiments of the present approach. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "are," and "the" are intended to include the plural forms as well, unless the context clearly indicates otherwise. It will be further understood that the terms "comprises" and/or "comprising," When used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. An electronically implemented method for validating a certified electronic academic credential, the method comprising:

storing, in a validation database, a plurality of certified electronic credential records corresponding to a plurality of certified electronic academic credentials and associated authentication information, wherein each record is associated with an authentication information and comprising an academic credential status; each certified electronic academic credential and associated authentication information is associated with at least one credentialer selected from a plurality of credentialers, and each credentialer directly provides a unique credentialer validation portal interface;

receiving a certified electronic credential validation request and proffered authentication information redirected from a first credentialer's credentialer validation portal interface, the first credentialer's credentialer validation portal interface available directly from and unique to the first credentialer;

identifying a certified electronic credential record in the validation database associated with the proffered authentication information;

generating a validation response based on the identified certified electronic credential record;

transmitting the validation response to the first credentialer's credentialer validation portal interface; and displaying validation information based on at least a portion of the validation response at the first credentialer's credentialer validation portal interface.

2. The certified electronic credential validation method of claim 1, further comprising determining whether the proffered authentication information is associated with an invalid credential, and wherein the validation response comprises an unsuccessful response when the credential is invalid.

3. The certified electronic credential validation method of claim 1, further comprising receiving a credential update from the first credentialer, wherein the credential update modifies a certified electronic credential record associated with a credential issued by the first credentialer.

4. The certified electronic credential validation method of claim 1, wherein the validation response includes validating information associated with the identified certified electronic credential record.

5. The certified electronic credential validation method of claim 1, wherein the validating information comprises at least one of a recipient's identity, a confirmation of the credential(s) bestowed upon the recipient, a date associated with a credential, coursework, grade point average, class rank, and security clearance.

6. The certified electronic credential validation method of claim 1, wherein a validating entity submits the certified electronic credential validation request and proffered authentication information through the first credentialer's credentialer validation portal interface.

7. The certified electronic credential validation method of claim 1, wherein the validation response includes a validation transactional record.

8. The certified electronic credential validation method of claim 7, wherein the validation transactional record comprises at least one of: information relating to the validation response, the date of the validation response, the proffered authentication information, the credential associated with the proffered authentication information, and the identity of the credentialer.

9. The certified electronic credential validating method of claim 8, wherein the validation transactional record comprises at least one document integrity security feature, and at least one document usage security feature.

10. The certified electronic credential validation method of claim 1, further comprising generating a record relating to the validation response and the transmittal of the validation response.

11. The certified electronic credential validation method of claim 1, further comprising:

receiving an order for a plurality of certified electronic credentials from an ordering credentialer;

producing the plurality of certified electronic credentials;

associating an authentication information with each certified electronic credential; and generating a certified electronic credential record for each certified electronic credential.

12. The certified electronic credential validation method of claim 11, wherein the each certified electronic credential record is associated with the authentication information associated with the respective certified electronic credential, and wherein producing the plurality of certified electronic credentials comprises placing at least a first portion of the associated authentication information on a viewable portion of each certified electronic credential.

13. The certified electronic credential validation method of claim 11, wherein each certified electronic credential comprises at least one document integrity security feature and at least one document usage security feature.

14. The certified electronic credential validation method of claim 11, wherein each certified electronic credential includes at least a second portion of the associated authentication information in machine-readable format.

15. The certified electronic credential validation method of claim 11, wherein the authentication information comprises a universal record locating number.

16. The certified electronic credential validation method of claim 11, further comprising delivering the plurality of certified electronic credentials and associated authentication information to at least one of a plurality of recipients and a credentialer.

17. The certified electronic credential validation method of claim 1, wherein the authentication information comprises a universal record locating number.

18. The certified electronic credential validation method of claim 1, wherein the validation response includes an indicium of the academic credential status.

19. The certified electronic credential validation method of claim 1, wherein the academic credential comprises one of a diploma, a license, a certificate indicative of an achievement, a transcript, an award.

20. An electronically implemented method for generating and validating certified electronic academic credentials, the method comprising:

receiving an order for a plurality of certified electronic credentials from an ordering credentialer;

producing the plurality of certified electronic credentials;

associating an authentication information with each certified electronic credential;

generating a certified electronic credential record for each certified electronic credential;

storing the plurality of certified electronic credential records and associated authentication information, wherein each record is associated with an authentication information, in a validation database and comprising an academic credential status; each certified electronic academic credential and associated authentication information is associated with at least one credentialer selected from a plurality of credentialers, and each credentialer directly provides a unique credentialer validation portal interface;

receiving a certified electronic credential validation request and proffered authentication information redirected from a first credentialer's credentialer validation portal interface provided directly by and unique to the first credentialer;

identifying a certified electronic credential record in the validation database associated with the proffered authentication information;

generating a validation response based on the identified certified electronic credential record;

transmitting the validation response to the first credentialer's credentialer validation portal interface; and displaying validation information based on at least part of the validation response at the first credentialer's credentialer validation portal interface.

21. The certified electronic credential generation and validation method of claim 20, wherein producing a certified electronic credential includes generating a computer-readable file representative of a credential bestowed upon a recipient, the computer-readable file protected with at least one of: at least one document integrity security feature, and at least one document usage security feature.

22. The certified electronic credential generation and validation method of claim 21, wherein the at least one document integrity security feature is selected from the group comprising: an Adobe Digital Signature, a digital certificate, a tamper-evidencing feature, and a data alteration feature.

23. The certified electronic credential generation and validation method of claim 21, wherein the at least one document usage security feature is selected from the group comprising: file password protection, a printing restriction, printing disablement, a file copying restriction, file copying disablement, and image disruptions.

24. An electronic system for generating and validating certified electronic academic credentials, the system comprising:
a certified electronic credentials order database having data relating to an order for a plurality of certified electronic academic credentials from an ordering credentialer;
a validation database having (1) a plurality of authentication information, each authentication information associated with a certified electronic credential, and (2) a plurality of certified electronic credential records, each certified electronic credential record associated with a certified electronic credential and comprising an academic credential status;
a plurality of credentialers and a plurality of credentialer validation portal interfaces, each credentialer validation portal interface unique to and provided directly by a credentialer;
a validation request interface configured to receive a certified electronic credential validation request and proffered authentication information redirected from a first credentialer's credentialer validation portal interface provided directly by and unique to the first credentialer;
a computer processor configured to identify a certified electronic credential record in the validation database associated with the proffered authentication information, generate a validation response based on the identified certified electronic credential record; and transmit the validation response to the first credentialer validation portal interface;
wherein the first credentialer validation portal interface is configured to display validation information based on at least a portion of the validation response.

25. The certified electronic credential generating and validating system of claim 24, wherein a certified electronic credential comprises a computer-readable file representative of a credential bestowed upon a recipient, the computer-readable file protected with at least one of: at least one document integrity security feature, and at least one document usage security feature.

26. The certified electronic credential generating and validating system of claim 25, wherein the at least one document integrity security feature is selected from the group comprising: an Adobe Digital Signature, a digital certificate, a tamper-evidencing feature, and a data alteration feature.

27. The certified electronic credential generating and validating system of claim 25, wherein the at least one document usage security feature is selected from the group comprising: file password protection, a printing restriction, printing disablement, a file copying restriction, file copying disablement, and image disruptions.

28. The certified electronic credential generating and validating system of claim 24, wherein the validation response includes a validation transactional record.

29. The certified electronic credential generating and validating system of claim 28, wherein the validation transactional record comprises at least one of: information relating to the validation response, the date of the validation response, the proffered authentication information, the credential associated with the proffered authentication information, and the identity of the first credentialer.

30. The certified electronic credential generating and validating system of claim 29, wherein the validation transactional record comprises at least one document integrity security feature, and at least one document usage security feature.

* * * * *